US012671337B2

(12) United States Patent
Floriani

(10) Patent No.: US 12,671,337 B2
(45) Date of Patent: Jun. 30, 2026

(54) CONTROL DEVICE AND METHOD FOR SWITCHING VOLTAGE REGULATOR

(71) Applicant: STMicroelectronics International N.V., Geneva (CH)

(72) Inventor: Ivan Floriani, Milan (IT)

(73) Assignee: STMicroelectronics International N.V., Geneva (CH)

( * ) Notice: Subject to any disclaimer, the term of this patent is extended or adjusted under 35 U.S.C. 154(b) by 197 days.

(21) Appl. No.: 18/769,734

(22) Filed: Jul. 11, 2024

(65) Prior Publication Data

US 2025/0079992 A1 Mar. 6, 2025

(30) Foreign Application Priority Data

Aug. 28, 2023 (IT) ......................... 102023000017652

(51) Int. Cl.
*H02M 3/158* (2006.01)
*H02M 3/157* (2006.01)

(52) U.S. Cl.
CPC ......... *H02M 3/1582* (2013.01); *H02M 3/157* (2013.01)

(58) Field of Classification Search
CPC ........................... H02M 3/1582; H02M 3/157
See application file for complete search history.

(56) References Cited

U.S. PATENT DOCUMENTS

| | | | | |
|---|---|---|---|---|
| 10,243,463 B2 * | 3/2019 | Sun | ...................... | H02M 3/1582 |
| 10,978,947 B2 * | 4/2021 | Amin | .................... | H02M 3/158 |
| 11,616,443 B2 * | 3/2023 | Lien | .................... | H02M 3/1582 |
| | | | | 323/271 |
| 2017/0207703 A1 * | 7/2017 | Houston | ............. | H02M 3/1582 |
| 2017/0257031 A1 * | 9/2017 | Shao | .................... | H02M 3/1582 |
| 2021/0067041 A1 | 3/2021 | Cho et al. | | |
| 2022/0209763 A1 * | 6/2022 | Poletto | .................. | H02M 3/156 |
| 2023/0421039 A1 | 12/2023 | Castorina et al. | | |

FOREIGN PATENT DOCUMENTS

| | | |
|---|---|---|
| CN | 111262435 A | 6/2020 |
| EP | 4113815 A1 | 1/2023 |
| EP | 4297258 A1 | 12/2023 |

OTHER PUBLICATIONS

Mao, Tianhao et al., "Soft Switching Control Strategy of Four-Switch Buck-Boost Converter for High Efficiency," 2022 IEEE International Power Electronics and Application Conference and Exposition (PEAC), IEEE, Nov. 4-7, 2022, 7 pages.

* cited by examiner

*Primary Examiner* — Rafael O De Leon Domenech
(74) *Attorney, Agent, or Firm* — Slater Matsil, LLP

(57) ABSTRACT

Control device for a switching voltage regulator. A control loop circuit generates a control signal indicative of the difference between the output voltage of a switching circuit and a nominal voltage. A drive signal generator is coupled to the control loop circuit and receives a measurement signal indicative of the current flowing in the switching circuit. The drive signal generator also receives a reference signal correlated to the control signal and generates pulse-width modulated switching signals for the switching circuit to maintain the output voltage at a regulated value. The drive signal generator compares the measurement signal with the reference signal at the peaks of the measurement signal in the first measurement mode and at the valleys of the measurement signal in the second. An offset generator generates an offset signal which is added to the control signal at a transition between the first and the second measurement modes.

20 Claims, 7 Drawing Sheets

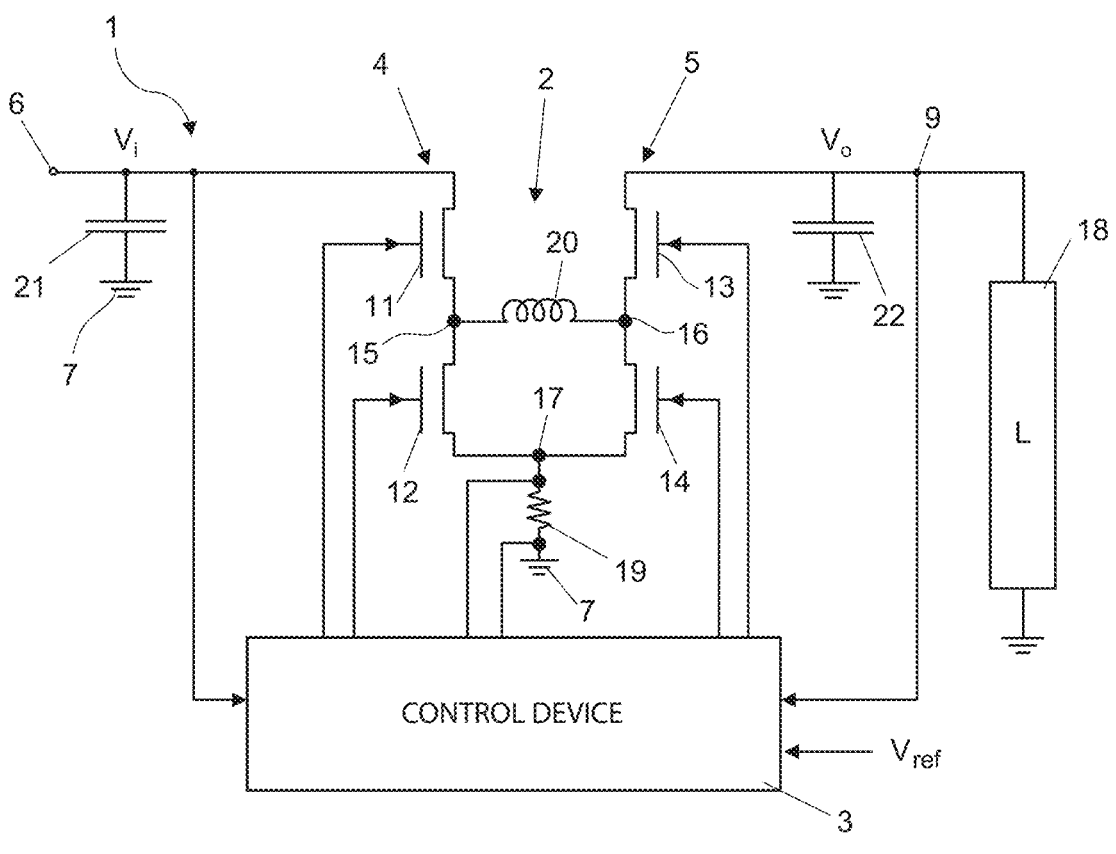
FIG. 1
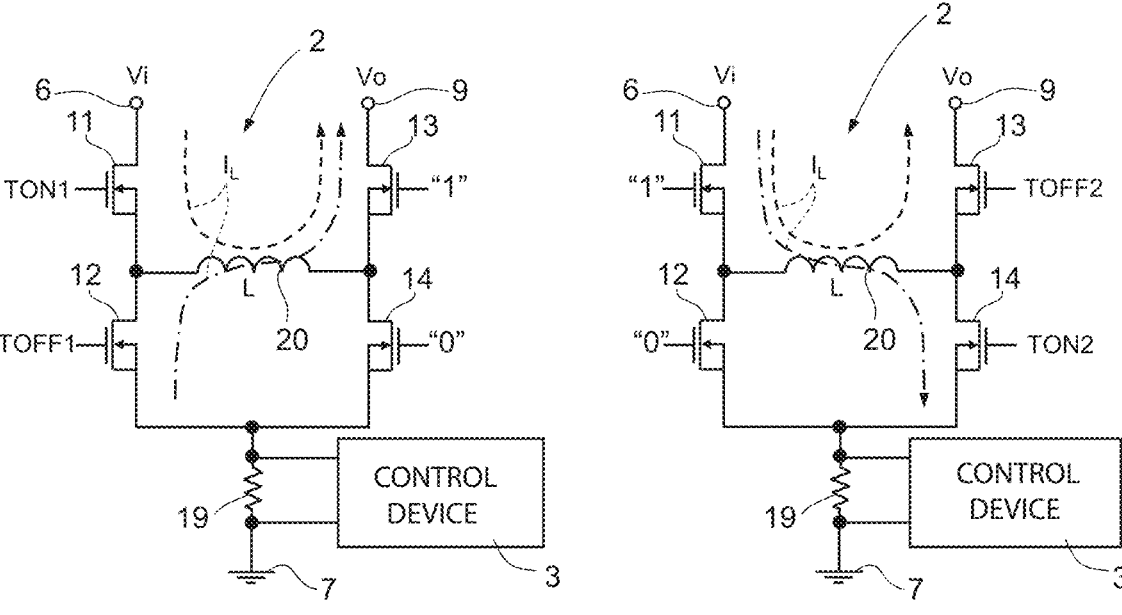
FIG. 2A                              FIG. 2B

CONTROL DEVICE AND METHOD FOR SWITCHING VOLTAGE REGULATOR

CROSS-REFERENCE TO RELATED APPLICATIONS

This application claims priority to Italian Application No. 102023000017652, filed on Aug. 28, 2023, which application is hereby incorporated by reference herein in its entirety.

TECHNICAL FIELD

The present invention relates to a control device and a method for switching voltage regulator.

BACKGROUND

Switching voltage regulators are devices that convert an input direct voltage (DC) into an output direct voltage. They may have different topologies, one of the most widespread being the four-switch non-inverting topology.

Switching voltage regulators may also operate according to different modes, including the buck control mode (step-down) and the boost control mode (step-up). Regulators (so-called buck-boost regulators) are also known, which use both control modes in different operating steps of the regulator, depending on the value of the input voltage and, in particular, on the relationship (greater or smaller) of the input voltage with respect to the output voltage.

Switching voltage regulators of this type are based on the regulation of the duty cycle, i.e., the on and off times of switches, and may be represented by the block diagram of FIG. 1.

FIG. 1 shows a voltage regulator 1 comprising a switching circuit 2 and a control device 3. The switching circuit 2 is here formed by a first half-bridge 4 and a second half-bridge 5.

The first half-bridge 4 is formed by a first high-side switch (first HSS 11) and a first low-side switch (first LSS 12), series-coupled between an input terminal 6 and a reference potential line (ground) 7. An input voltage Vi is applied between the input terminal 6 and the reference potential line 7.

The second half-bridge 5 is formed by a second high-side switch (second HSS 13) and a second low-side switch (second LSS 14), series-coupled between an output terminal 9 and the reference potential line 7. An output voltage Vo, referred to as ground, is present at the output terminal 9 and is provided to load 18.

The switches 11-14 are typically formed by MOSFET devices. The low-side switches (first LSS 12 and second LSS 14) have source terminals mutually coupled at a common node 17.

A sense resistor 19 is arranged between the common node 17 and the reference potential line 7.

An inductor 20 is coupled between intermediate nodes 15 and 16 of the first and the second half-bridges 4 and 5.

An input capacitor 21, on which the input voltage Vi is applied, is coupled to the input terminal 6. An output capacitor 22, on which the output voltage Vo is applied, is coupled to the output terminal 9.

The control device 3 is coupled to the input terminal 6 and the output terminal 9 and receives a reference voltage $V_{ref}$. Furthermore, the control device 3 is coupled to the control terminals of switches 11-14 and the sense resistor 19 to operate a current control of switching circuit 2.

Regulators operating in buck-boost control mode operate in buck control mode when the input voltage Vi is greater than the output voltage Vo and vice versa. In some cases, transition phases, called buck-boost transition phases, may be envisaged.

In the buck control mode, control device 3 controls on and off, in an alternated way, the first HSS 11 and the first LSS 12; furthermore, it keeps the second HSS 13 always on and the second LSS 14 always off, as shown in FIG. 2A.

In particular, control device 3 generates a first switching signal, TON1, and a second switching signal, TOFF1, which are digital and opposite to each other. Signals TON1 and TOFF1 are provided respectively to the first HSS 11 and to the first LSS 12, which switch in opposite manners. As indicated, the second HSS 13 is always on (in FIG. 2A, it receives a high logic signal "1"), and the second LSS 14 is always off (in FIG. 2A, it receives a low logic signal "0").

Therefore, in the switching circuit 2, when the first switching signal TON1 is high (logic signal "1") and the second switching signal TOFF1 is low (logic signal "0"), the first HSS 11 is on, the first LSS 12 is off, and a current (inductor current $I_L$) flows into the first HSS 11, the inductor 20, and the second HSS 13, as shown by a dashed line. Since the voltage on the inductor 20 is positive and equal to (Vi−Vo), the inductor current $I_L$ increases linearly with slope (Vi−Vo)/L (L being the inductance of the inductor 20).

When the first and the second switching signals TON1, TOFF1 switch, the first HSS 11 switches off, the first LSS 12 switches on, and the inductor current $I_L$ flows into the first LSS 12, the inductor 20 and the second HSS 13, as shown by a dash-dotted line. In this time interval, since the voltage on the inductor 20 is negative (Vi>Vo) and equal (as a first approximation, neglecting the drop on the sense resistor 19) to −Vo, the inductor current $I_L$ decreases linearly with slope −Vo/L.

In this phase, the sense resistor 19 senses the inductor current $I_L$, provided to the control device 3.

In boost mode, control device 3 controls on and off, in an alternated way, the second HSS 13 and the second LSS 14; furthermore, it keeps the first HSS 11 always on and the first LSS 12 always off, as shown in FIG. 2B.

In particular, control device 3 generates a third switching signal, TOFF2, and a fourth switching signal, TON2, which are digital and opposite to each other. Signals TOFF2 and TON2 are provided respectively to the second HSS 13 and to the second LSS 14, which, therefore, switch in opposite manners. As indicated, the first HSS 11 is always on (in FIG. 2B, it receives a high logic signal "1"), and the first LSS 12 is always off (it receives a low logic signal "0").

Therefore, in the switching circuit 2, when the fourth switching signal TON2 is high (logic signal "1") and the third switching signal TOFF2 is low (logic signal "0"), the second HSS 13 is off, the second LSS 14 is on, and the inductor current $I_L$ flows into the first HSS 11, the inductor 20, and the second LSS 14, as shown by a dash-dotted line. Therefore, the voltage on the inductor 20 is positive (equal, in a first approximation, to Vi, neglecting the drop on the sense resistor 19), and the inductor current $I_L$ increases linearly with slope Vi/L.

In this phase, the sense resistor 19 senses the inductor current $I_L$ and provides it to the control device 3.

When the third and the fourth switching signals TON2, TOFF2 switch, the second LSS 14 switches off, the second HSS 13 switches on, and the inductor current $I_L$ flows into the first HSS 11, the inductor 20 and the second HSS 13, as shown by a dashed line. In this time interval, since the voltage on the inductor 20 is negative (Vi<Vo) and equal to Vi–Vo, the inductor current $I_L$ decreases linearly with slope (Vi–Vo)/L.

Furthermore, in a manner known per se and not described in detail, in the transition phases between the buck control mode and the boost control mode, a mixed control mode, called "buck-boost" control mode, is often used, wherein buck-mode control cycles and boost-mode control cycles are alternated, controlling selective switching-on and switching-off of all the switches 11-14 of the half-bridges 4, 5.

As indicated, in both control modes, control device 3 uses the inductor current IL sensed by the sense resistor 19 (the valley value in buck control mode and the peak value in boost control mode) to control the output voltage Vo and keep it proximate to the reference value $V_{ref}$.

To this end, control device 3 generally performs a current loop control of the switching circuit 2. An example of control device 3 operating in this manner is shown in the simplified block diagram of FIG. 3.

In detail, in FIG. 3, the control device 3 comprises a control loop circuit 31 which measures an error between the output voltage Vo and the reference voltage $V_{ref}$ and generates a control signal $I_C$ (a current control signal), correlated to this error; a ramp generator 32 which generates a current ramp $I_s$; an adder node 33 which generates a reference current $I_R$ as the sum of the control signal $I_C$ and the current ramp $I_s$ ($I_R=I_C+I_s$); a PWM modulator 34 which compares the inductor current $I_L$ with the reference current $I_R$ and generates a modulation signal PWM; and a drive logic 36 which generates the switch control signals TON1, TOFF1, TON2, TOFF2 from the modulation signal PWM.

In the control device 3, the modulation signal PWM has a fixed period, and the PWM modulator 34 modifies, in use, the duty cycle of each period of the modulation signal PWM in response to the comparison between the reference current $I_C+I_s$ and the inductor current $I_L$.

With this type of regulation, the problem exists that, during transitions between buck and boost control modes, due to the slow adaptation of the control signal $I_C$ (due to the presence of capacitances and compensation networks on the control node), the output voltage Vo may undergo undesirable transients.

In this regard, in reference to FIG. 4, the plot of the inductor current $I_L$ and the corresponding output voltage Vo as a function of time, in a transition step from the buck control mode to the boost control mode.

In particular, FIG. 4 shows with a circle the acquisition points of the value of the inductor current $I_L$ at the valleys when the voltage regulator 1 operates in buck mode and at the peaks when the voltage regulator 1 operates in boost mode, as indicated above.

FIG. 4 also shows the desired average output current Io and the plot of the control signal Ic of FIG. 3 (indicative of the transition threshold) to obtain the desired average output current Io.

As is noted, initially, in the buck control mode and in regulated condition, the valley value of the inductor current $I_L$ is approximately equal to the value of the control signal Ic (indicated by Ic (buck)).

When voltage regulator 1 enters the boost control mode, the comparison between the inductor current $I_L$ and the control current Ic occurs at the peaks of the inductor current $I_L$ (as indicated in the circles).

At this stage, in regulated condition, the control current Ic has a higher value (indicated in FIG. 4 by Ic (boost)), correlated to the peak value of the inductor current $I_L$; thereby, the average output current is equal to the desired value Io.

In the transient between the buck control mode and the boost control mode, however, due to the presence of resistive and capacitive elements in the control loop circuit 31 of FIG. 3, the change in the value of the control current Ic up to the new regulated value Ic (boost) does not occur instantaneously, and the value of the control current Ic increases gradually (as shown in the transient portion of the control current Ic, indicated by Ic (trans) and with dashed line), to reach the regulated-condition steady value Ic (boost).

FIG. 4 also shows the corresponding plot of the output voltage Vo; as is noted, in the passage from the buck control mode to the boost control mode, the output voltage Vo undergoes a significant excursion (reduction) ΔVo. This reduction, whose value also depends on the control loop bandwidth, is, however, undesired in a voltage regulator.

SUMMARY

The aim of the present invention is to provide a solution to overcome the drawbacks of the prior art.

A first aspect relates to a control device for a switching voltage regulator comprising a switching circuit. The control device comprising a control loop circuit configured to generate a control signal indicative of a difference between an output voltage of the switching circuit and a nominal voltage; a drive signal generator circuit coupled to the control loop circuit and configured to receive a measurement signal and a reference signal correlated to the control signal, the measurement signal indicative of a current flowing into the switching circuit, compare the measurement signal with the reference signal at peaks of the measurement signal in a first measurement mode, compare the measurement signal with the reference signal at valleys of the measurement signal in a second measurement mode, and generate pulse-width modulated switching signals for the switching circuit to maintain the output voltage at a regulated value; an offset generator circuit configured to generate an offset signal at a transition between the first measurement mode and the second measurement mode; and an adder arranged between the control loop circuit and the drive signal generator circuit, the adder configured to add the offset signal and the control signal to generate the reference signal.

A second aspect relates to a switching voltage regulator. The switching voltage regulator comprising a switching circuit comprising a high-side switch and a low-side switch, the high-side switch and the low-side switch being series coupled to a low-side switch arranged between an input node and a reference potential line; a control device configured to control an operation of the high-side switch and the low-side switch, the control device comprising a control loop circuit configured to generate a control signal indicative of a difference between an output voltage of the switching circuit and a nominal voltage; a drive signal generator circuit coupled to the control loop circuit and configured to receive a measurement signal and a reference signal correlated to the control signal, the measurement signal indicative of a current flowing into the switching circuit, compare the measurement signal with the reference signal at peaks of the measurement signal in a first measurement mode, compare the measurement signal with the reference signal at valleys of the measurement signal in a second measurement mode, and generate pulse-width modulated switching signals for the switching circuit to maintain the output voltage at a regulated value; an offset generator circuit configured to generate an offset signal at a transition between the first measurement mode and the second measurement mode; and an adder arranged between the control loop circuit and the drive signal generator circuit, the adder configured to add the offset signal and the control signal to generate the reference signal.

A third aspect relates to a method of operating a switching voltage regulator, the method comprising receiving an input voltage of a switching circuit of the switching voltage regulator; receiving an output voltage of the switching circuit; receiving a measurement signal indicative of a current flowing into the switching circuit; generating a control signal correlated to a difference between the output voltage and a nominal voltage; generating pulse-width modulated switching signals based on a comparison between the measurement signal and a reference signal correlated to the control signal, the pulse-width modulated switching signals generated to maintain the output voltage at a regulated value, wherein the comparison between the measurement signal and the reference signal occurs at peaks of the measurement signal in a first measurement mode and at valleys of the measurement signal in a second measurement mode; and adding an offset signal to the control signal in a transition between the first measurement mode and the second measurement mode.

According to the present invention, a control device and method for a switching voltage regulator are provided, as defined in the attached claims.

BRIEF DESCRIPTION OF THE DRAWINGS

For a better understanding of the present invention, some embodiments thereof are now described, purely by way of non-limiting example, with reference to the attached drawings, wherein:

FIG. 1 shows a simplified circuit diagram of a known voltage regulator comprising a switching circuit and a control device;

FIG. 2A shows the current flow in the switching circuit of FIG. 1 in case of buck mode operation;

FIG. 2B shows the current flow in the switching circuit of FIG. 1 in the case of boost mode operation;

DETAILED DESCRIPTION OF ILLUSTRATIVE EMBODIMENTS

Figure 3:
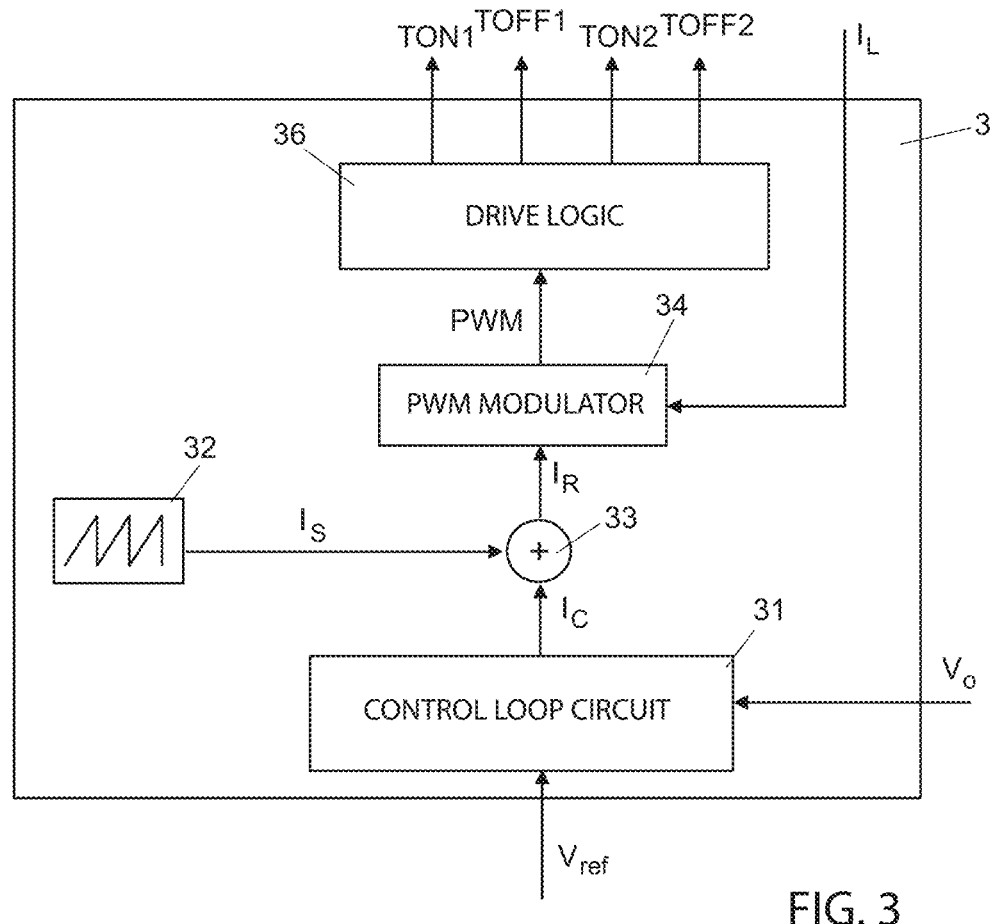
FIG. 3 shows a block diagram of a known control device.
Figure 5:
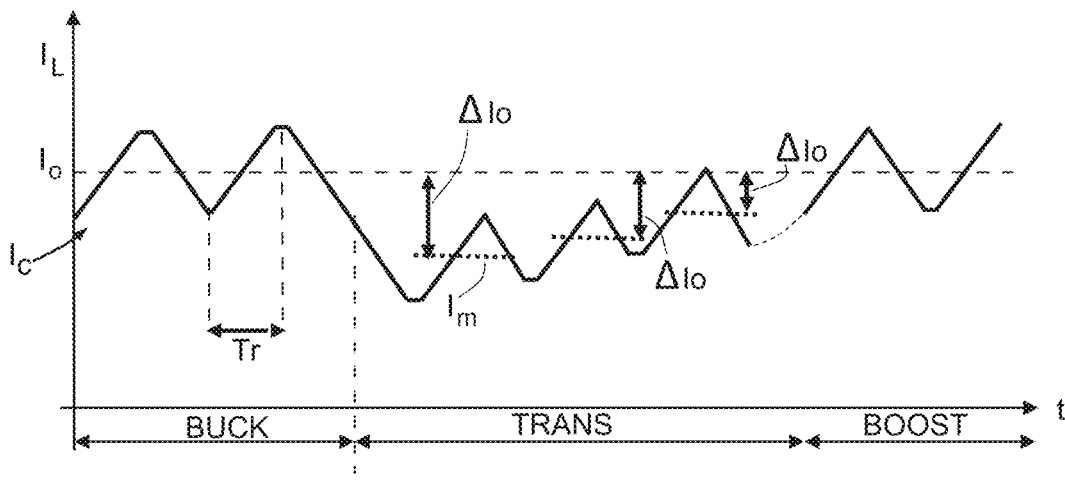
FIG. 5 shows the plot of the control signal in the control device of FIG. 3.

FIG. 5 shows approximately the behavior of the control current Ic during a transient from a buck control mode (with valley current measurement) to a boost control mode (with peak current measurement) and highlights the output current difference $\Delta Io$ between the (desired) regulated average current Io and the average value Im of the inductor current $I_L$, shown with horizontal dashed line, during transition, for the switching circuit 2 of FIG. 3.

As is noted, the output current difference $\Delta Io$ is very high immediately after switching to the peak measurement mode and gradually reduces to reach the (desired) regulated average current Io in boost control mode.

For completeness, it should be noted that a buck-boost control mode is used during the transient between the buck control mode and the boost control mode (and vice versa).

The Applicant has realized that this output current difference $\Delta Io$ corresponds to the current necessary to keep the output voltage Vo at a regulation value and that, by compensating for this output current difference $\Delta Io$, both the excursion $\Delta Vo$ in the voltage output and the duration of the transient when switching between the valley and peak measurement modes may be significantly reduced.

Figure 6:
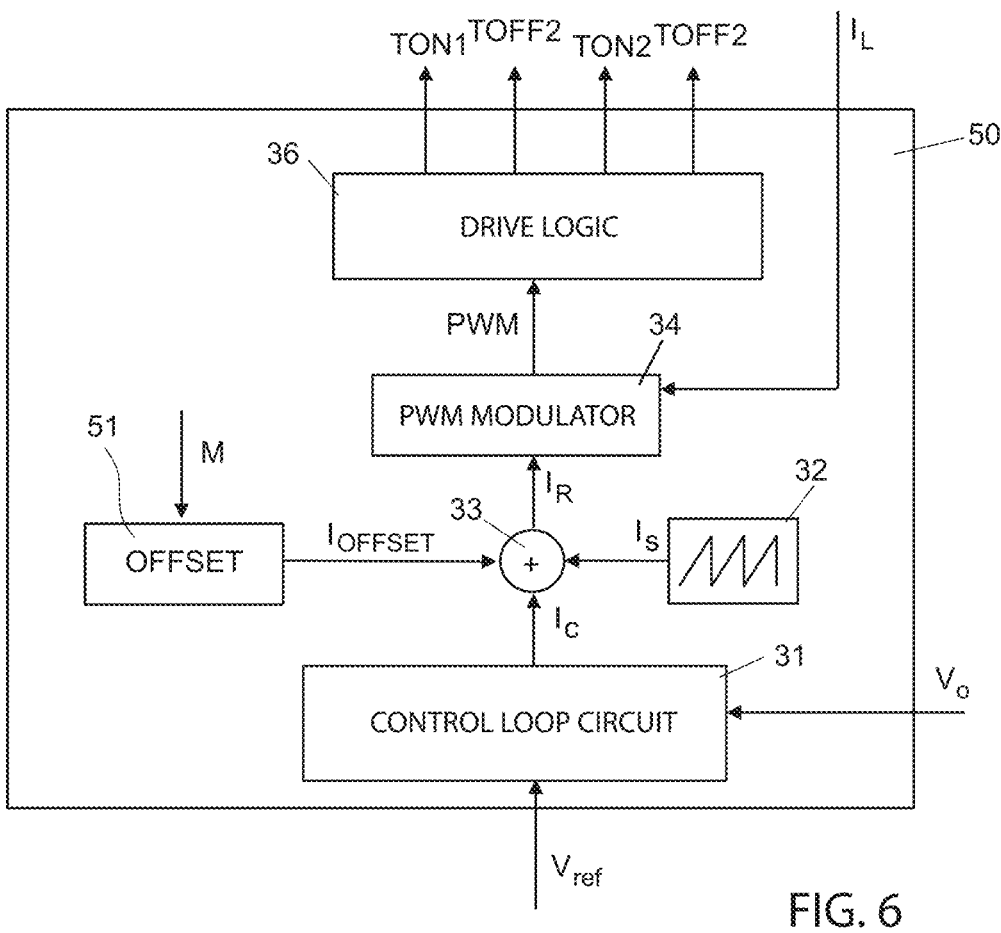
FIG. 6 shows a block diagram of an embodiment of the present control device.

FIG. 6 shows a control device 50 capable of compensating the output current difference $\Delta Io$ discussed above.

The control device 50 is couplable to a switching circuit, similarly to the control device 3 in FIG. 1. The switching circuit is, therefore, not shown in FIG. 5 and may be formed like the switching circuit 2 of FIG. 1.

The control device 50 has a general structure similar to the control device 3 of FIG. 3. Consequently, the elements of the control device 50 common to the control device 3 of FIG. 3 have been provided with the same reference numbers and will only be described briefly.

In embodiments, the control device 50 comprises a control loop circuit 31, which generates the control signal $I_C$, a current signal, correlated to the difference between the output voltage Vo and a reference voltage $V_{ref}$; a ramp generator 32, which generates a current ramp $I_s$; an adder node 33 which receives the current ramp $I_s$ and the control signal $I_C$ and generates a reference current $I_R$; a PWM modulator 34, which compares the inductor current $I_L$ with the reference current $I_R$ and generates a pulse width modulation signal PWM; and a drive logic 36, which generates switch control signals TON1, TOFF1, TON2, TOFF2 from the modulation signal PWM, similarly to the control device 3 of FIG. 3.

The control device 50 further comprises an offset generator 51 generating an offset current $I_{OFFSET}$ which is added to the control signal $I_C$ and the current ramp $I_s$ in the adder node 33 at the transient between the buck and boost control modes, in particles in the transient from the buck control mode to the boost control mode. In the control device 50, therefore, during the transients, the reference current $I_R$ is equal to the sum of three currents, the current ramp $I_s$, the control signal $I_C$ and the offset current $I_{OFFSET}$, $I_R=I_C+I_s+I_{OFFSET}$.

The offset current $I_{OFFSET}$ may be maintained only during the transient phase or throughout the peak control phase. To this end, the offset generator 51 receives an activation signal M, for example a digital signal whose logic level determines the active or inactive state of the offset generator 51. Here, the activation signal M is also indicative of the measurement mode of the current, valley or peak current, and therefore has a first logic state (for example a high logic state) during the valley measurement operation and a second logic level, in the example a low logic state, in the valley measurement mode. Alternatively, it might be indicative of the transitions of the control modes.

Figure 7:
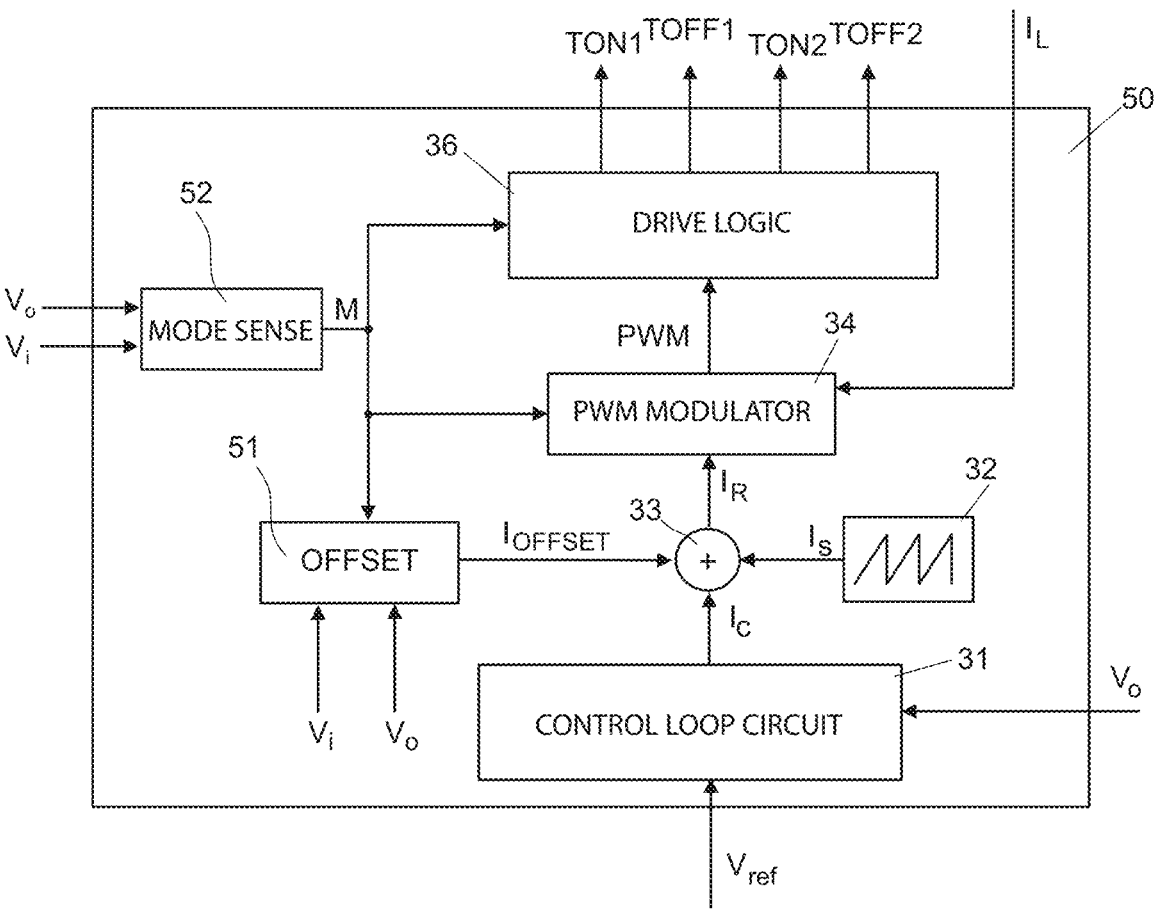
FIG. 7 shows another block diagram of an embodiment of the present control device.

The activation signal M may be generated in different manners: for example, as shown in FIG. 7, the activation signal M is generated by a mode sense block 52 receiving at input the output voltage Vo and the input voltage Vi.

In this case, the mode sense block 52 may be a simple comparator that compares the input voltage Vi and the output voltage Vo to each other and generates the activation signal M as a digital signal having a first logic value (for example a high value) when Vi>Vo and conversely a second logic value (a low value in the example).

Alternatively, a hysteresis may be used in the comparison between Vi and Vo (for example using a hysteresis threshold comparator) to prevent the voltage regulator from oscillating between the high value and the low value when Vi is exactly equal to Vo.

The activation signal M may also be sent to the PWM modulator for the decision on sampling the inductor current $I_L$ at the valleys (buck control mode) or the peaks (boost control mode) or to the drive logic 36 for the decision of the drive sequence of the switches 11-14.

It should be noted that the activation signal M is also used in the buck-boost control phase, if provided, wherein the valley current for Vi>Vo and the peak current for Vi<Vo are sensed.

In this manner, as soon as the mode sense block 52 senses a predetermined ratio between the input voltage Vi and the output voltage Vo, it switches the activation signal M, the offset generator 51 is activated and provides the adder node 33 with the offset current $I_{OFFSET}$, which adds to the control signal $I_C$ and the current ramp Is.

The value of the offset current $I_{OFFSET}$ may be a fixed value, set in the factory or during the setting phase of the control device 50; or it may be a configurable or variable value.

For example, the value of the offset current $I_{OFFSET}$ may be calculated by an analog or digital circuit internal or external to the offset generator 51 on the basis of the electrical quantities (Vi, Vo, $I_L$, . . . ) of the voltage regulator.

In particular, the value of the offset current $I_{OFFSET}$ may be chosen to be equal to the ripple of the inductor current $I_L$ when the input voltage Vi becomes lower or higher than the output voltage Vo, is equal to:

$$\Delta I_{ripple} = V_o \frac{Tr}{L} \tag{1}$$

where Tr is the time interval between a peak and the successive valley of the inductor current $I_L$ (FIG. 5), L is the inductance of the inductor (20 in FIG. 1) and Vo is the output voltage of the voltage regulator.

For example, this value may be set on the basis of simulations.

Figure 8:
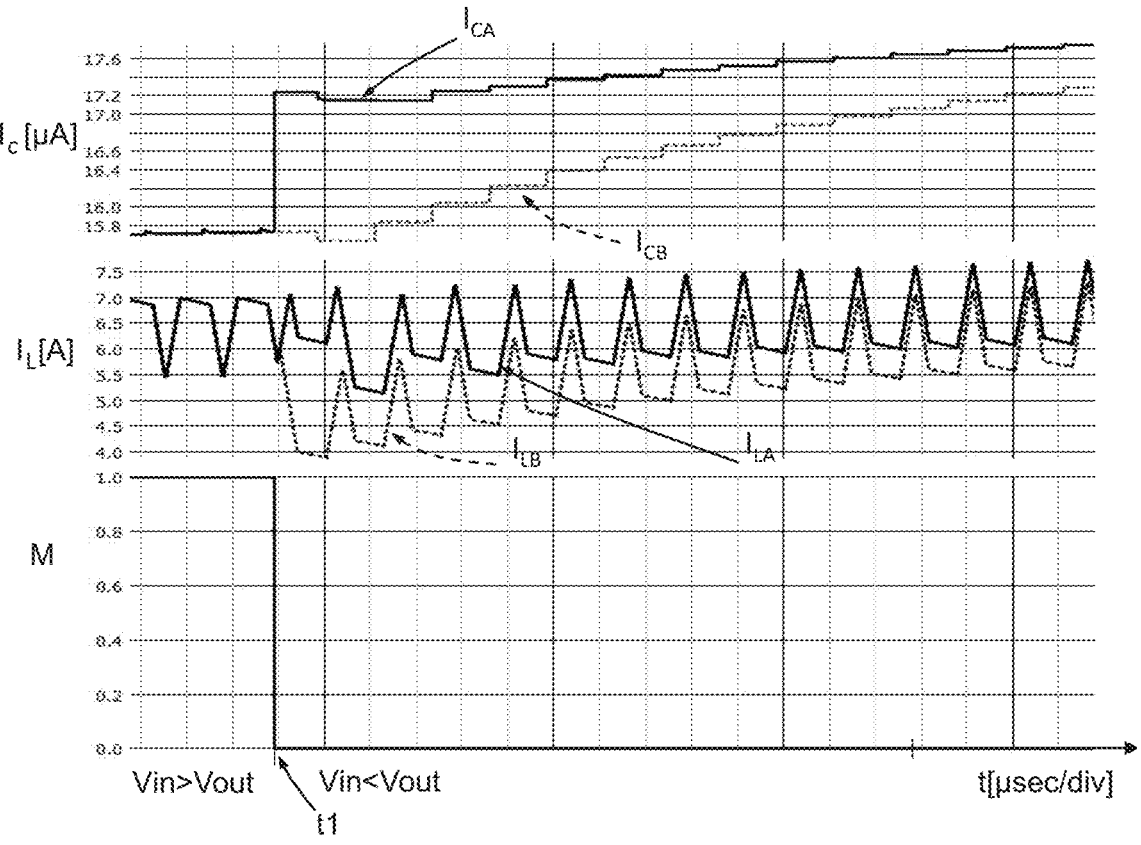
FIG. 8 shows simulations of some electrical quantities in the control device of FIG. 7, compared with similar electrical quantities in the control device of FIG. 3.

Simulations of the plots of the control current $I_C$ and the inductor current $I_L$, obtainable with the control device 50 of FIG. 7 and with current offset calculated according to (1) (curves $I_{CA}$ and $I_{LA}$) compared with the plots of the same quantities for the control device 3 of FIG. 2 (curves $I_{CB}$ and $I_{LB}$), are shown in FIG. 8, together with the plot of the activation signal M when passing from the buck mode operation to the boost mode operation.

As is noted, at instant t1, the input voltage Vi becomes lower than the output voltage Vo and the activation signal M switches from high to low.

Figure 4:
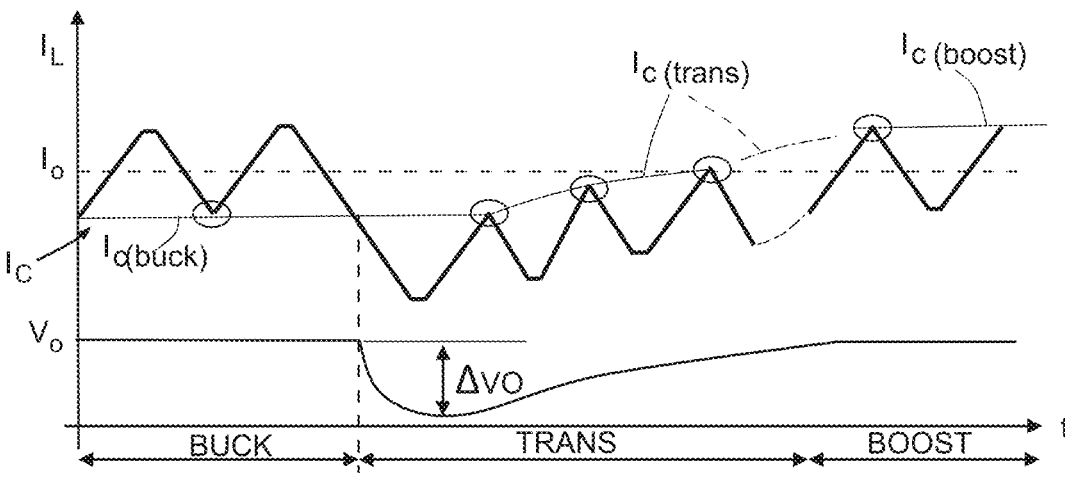
FIG. 4 shows the plot of some electrical quantities in the voltage regulator of FIG. 1 and in the control device of FIG. 3.

FIG. 8 shows that, while the curve of the reference current $I_{RB}$ obtainable with the control device 3 of FIG. 2 has a significant reduction (as discussed above with reference to FIG. 4), the curve of the reference current IRA obtainable with the control device 50 of FIG. 7 has an increase (current step), due to the injection of the offset current $I_{OFFSET}$. Furthermore, while the inductor current $I_{LB}$ obtainable with the control device 3 of FIG. 2 has a significant reduction and is detectable for several operating cycles, the inductor current $I_A$ obtainable with the control device 50 of FIG. 7 has a minimum reduction in the maximum and minimum values.

Figure 9:
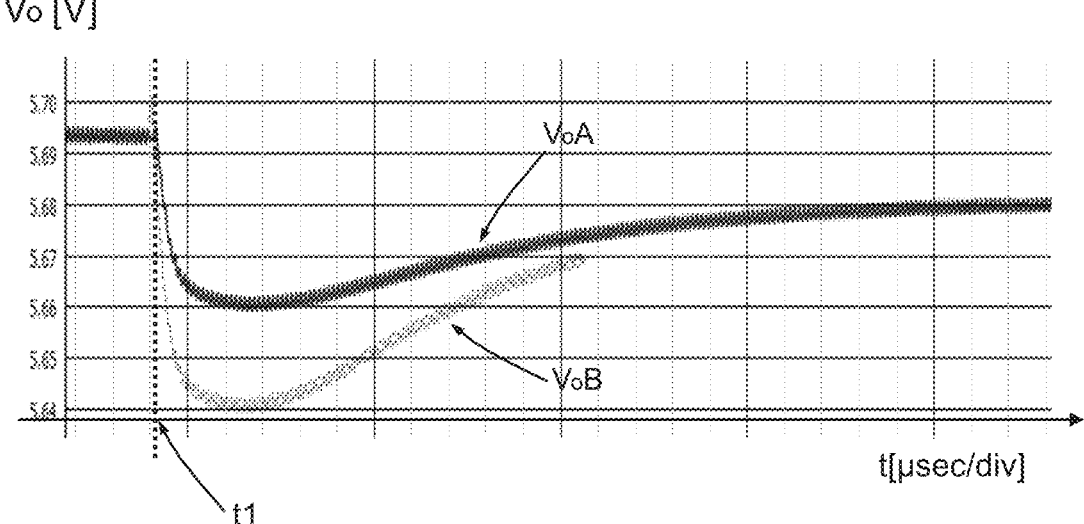
FIG. 9 shows a simulation of the behavior of the output voltage in the control device of FIG. 7 compared with the output voltage in the control device of FIG. 3.

As a result, when the offset current $I_{OFFSET}$ is injected, the output voltage Vo shows a lower reduction with respect to the boost steady value, as shown in FIG. 9, wherein the output voltage Vo is indicated by VoA and the output voltage Vo obtainable with the control device 3 of FIG. 2 is indicated by VoB. As is noted, in the simulation shown in FIG. 9, the output voltage VoA obtainable with the control device 50 of FIG. 7 has a reduction (with respect to the regulated boost value) of about 50% lower than the excursion presented by the voltage output VoB.

Figure 10:
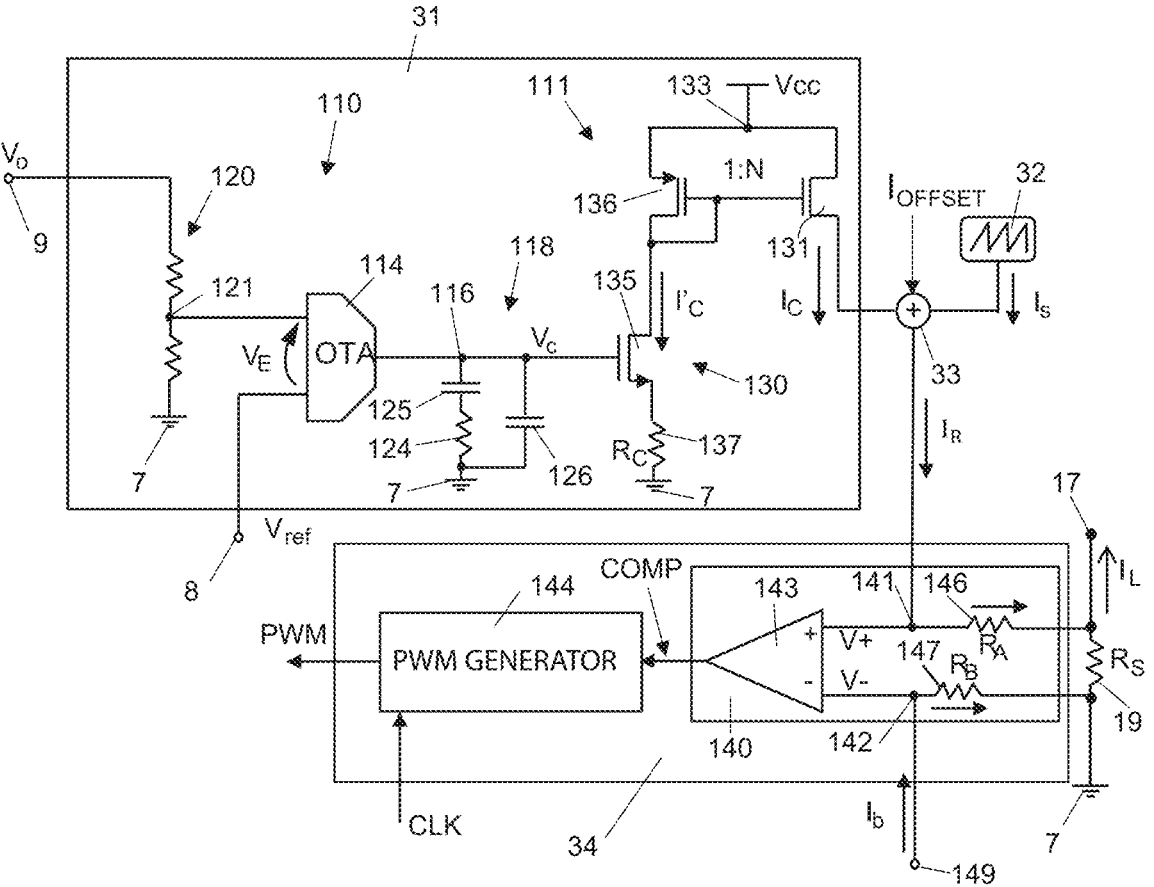
FIG. 10 is an exemplary circuit diagram of a block of the control device of FIG. 6 or 7.

FIG. 10 shows a possible implementation of the control loop circuit 31 and the PWM modulator 34. These circuits, described in detail in Italian patent application 102022000013240, filed on Jun. 22, 2022, corresponding to the European patent application 23178174.1, filed on Jun. 8, 2023, U.S. patent application Ser. No. 18/330,754, filed on Jun. 7, 2023, and Chinese patent application 202310742484.6, filed on Jun. 23, 2023, are briefly described hereinbelow, for completeness.

With reference to FIG. 10, the control loop circuit 31 comprises a compensation module 110, receiving the output voltage Vo and the reference voltage $V_{ref}$ and providing a control voltage $V_c$, and a voltage-to-current conversion module 111, providing the control signal $I_C$ as a function of the control voltage $V_c$.

The compensation module 110 comprises an error amplifier, here an operational transconductance amplifier (OTA) 114 having an output 116 providing an error signal $V_E$, indicative of the difference between the output voltage $V_o$ and the reference voltage $V_{ref}$, and a compensation network 118 coupled to the output 116 and generating the control voltage $V_c$.

In FIG. 10, the compensation module 110 further comprises a voltage divider 120 coupled between the output terminal 9 and the reference potential line 7 and having an intermediate node 121.

The OTA 114 has a first input coupled to the reference node 8 and a second input coupled to the intermediate node 121 of the voltage divider 120. In practice, the OTA 114 compares the reference voltage $V_{ref}$ with a fraction of the output voltage $V_o$.

The compensation network 118 is a parallel circuit coupled between the output terminal 6 and the reference potential line 7 and comprises a compensation resistor 124 and compensation capacitors 125, 126.

The voltage-to-current conversion module 11 is formed by a first mirror branch 130 and a second mirror branch.

The second mirror branch comprises an output transistor 131 of the PMOS type.

The first mirror branch 130 is a series circuit coupled between the reference potential line 7 and a supply line 133 at a supply voltage $V_{CC}$ with respect to the reference potential line 7, and comprising a first transistor 135, here of the NMOS type, a second transistor 136, here of the PMOS type, and a control resistor 137 having resistance $R_C$.

The first transistor 135 has a gate terminal coupled to the output 116 of the OTA 114, and therefore receives the control voltage $V_C$.

The second transistor 136 has the source terminal connected to the supply node 133 and the gate terminal connected to the drain terminal. Furthermore, the gate terminal of the second transistor 136 is connected to the gate terminal of the output transistor 131.

The first mirror branch 130 generates an intermediate control current $I'_C$, as a function of the control voltage $V_C$.

The first and the second mirror branches 130, 131 have a current mirror ratio of 1:N, so that the control loop circuit 31 provides at output the control signal $I_C$ equal to $N \cdot I'_C$.

The PWM modulator 34 comprises a current comparator 140, providing a comparison signal COMP, and a PWM generator 144, which generates the modulation signal PWM from a clock signal CLK and the comparison signal COMP.

The current comparator 140 comprises a comparator element 143 with a positive input 141 and a negative input 142, which provides the comparison signal COMP at the output.

The current comparator 140 further comprises a first resistor 146 having resistance $R_A$, coupled between the positive input 141 of the comparator element 143 and a first terminal of the sense resistor 19 (connected to the common node 17 of the switching circuit 2 of FIG. 1); and a second resistor 147 having resistance $R_B$, coupled between the negative input 142 of the comparator element 143 and a second terminal of the sense resistor 19 (connected to the reference potential line 7).

The positive input 141 of the comparator element 143 is coupled to an output of the adder node 33 and the negative input 142 of the comparator element 143 is coupled to a bias node 149 providing a bias current $I_b$.

It should be noted that the configuration shown of the current comparator 140 refers to the valley control mode. Actually, a pair of switches (not shown) connects the output of the adder node 33 to both inputs 141 and 142 of the comparator element 143 and another pair of switches (not shown) connects the bias node 149 to both inputs 141 and 142. These switches (not shown) are controlled so that, in peak control mode, the output of the adder node 33 is coupled to the negative input 142 of the comparator element 143 and the bias node 149 is coupled to the positive input 141 of the comparator element 143.

The PWM generator 144 provides the modulation signal PWM, which is digital, whose period is a function of the period T of the clock signal CLK, and whose duty-cycle is variable in each cycle (or period) of the modulation signal PWM, in a per se known manner.

It should be noted that the mirror circuit 131, 136 may be missing; in this case the drain terminal of the first transistor 135 may be connected directly to the adder node 33; with this solution, the current flowing into the first transistor 135 already represents the control signal $I_C$ provided to the adder node 33 (although of different sign).

The injection of the offset current $I_{OFFSET}$ during a transient between the valley current measurement based control and the peak current measurement based control described above for the voltage regulator 1 of FIG. 1 is also applicable to other types of voltage regulation circuits.

For example, it is applicable to a converter operating only in buck mode. In these circuits, switching between valley and peak current measurement modes is normally not necessary. The valley or peak current measurement mode is selected in the design step based on the ratio between the input voltage Vi and the output voltage Vo and other functions (for example, current limitation).

In some cases, especially in case of operation with a high ratio between the input and output voltages and therefore with a small duty-cycle, the duration of the switch-on time of the high-side transistor might be too short to allow correct operation of the current comparator (140 in FIG. 10). In this condition, using a measurement mode based on the valleys of the inductor current may be useful, because in this manner the current comparator has more time to sense the inductor current during the switch-off phase of the high-side transistor.

However, if the input voltage drops to becoming proximate to the output voltage, the duty-cycle increases and the switch-off time becomes very small. In this case it is more convenient to operate with the peak current measurement mode, owing to the longer switch-on time.

Also, in this case, therefore, switching between the valley current sense control mode and the peak current sense control mode may be useful.

Consequently, in this case, it is also advantageous to be able to inject an offset current during the transient between the two measurement modes.

Furthermore, in high-frequency converters that operate with a high ratio between the input voltage and the output voltage, with a high variation of the input or output voltages, operating in valley or peak current measurement mode according to the voltage difference between the input voltage and the output voltage (for example, valley measurement mode for a duty-cycle<50% and peak current measurement mode for a duty cycle>50%) might be convenient.

Switching from peak current sense mode to valley current sense mode also introduces an error in the current limitation value. This error may also be resolved by injecting an offset current.

Figure 11:
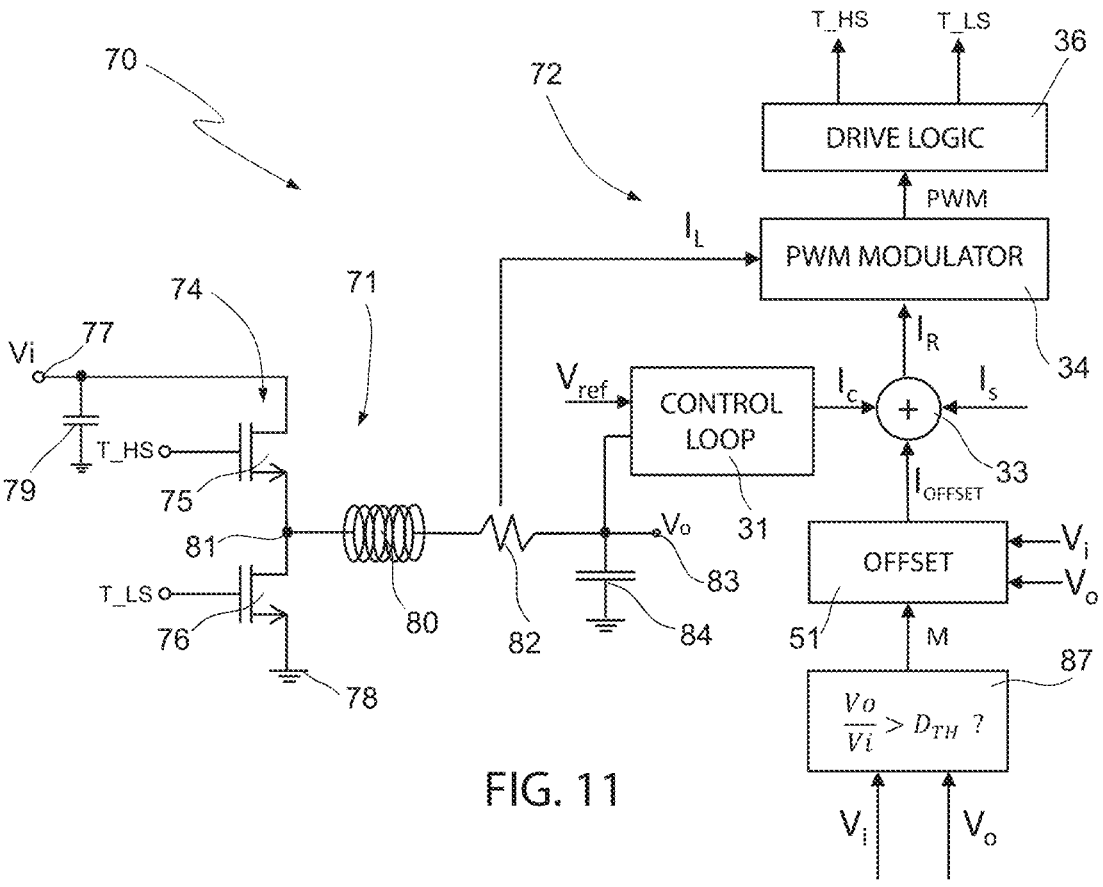
FIG. 11 shows a block diagram of a different embodiment of the present voltage regulator.

FIG. 11 shows an embodiment of a voltage converter operating only in buck mode, with switches arranged externally to the switching circuit and with measurement of the inductor current both at the peaks and at the valleys, alternately to each other, according to the operating conditions.

In detail, FIG. 11 shows a voltage converter 70 comprising a switching circuit 71 and a control device 73.

The switching circuit 71 is here formed by a half-bridge circuit 74 comprising a high-side switch (HSS 75) and a low-side switch (LSS 76), receiving respective control signals T_HS and T_LS (similar for example to the first switching signal TON1 and, respectively, to the second switching signal TOFF1 of FIGS. 1, 6 and 7) and series-connected between an input terminal 77 and a reference potential line (ground) 78. An input voltage Vi is applied between the input terminal 77 and the reference potential line 78 and an input capacitor 79, on which the input voltage Vi is applied, is coupled to the input terminal 77.

An inductor 80 has a first terminal coupled to an intermediate node 81 of the half-bridge 74. A sense resistor 82 is coupled between a second terminal of the inductor 80 and an output terminal 83.

An output capacitor 84, receiving the output voltage Vo, is coupled to the output terminal 83.

Control device 72 has a structure similar to control device 50 of FIG. 7; the elements of control device 72 common to control device 50 have therefore been provided with the same reference numbers and will not be described. In the control device 72, the mode sense block 52 is replaced by an activation block 87 based on sensing the ratio between the output voltage Vo and the input voltage Vi.

For example, the activation block 87 verifies whether the ratio between the output voltage Vo and the input voltage Vi is greater than a threshold value $D_{TH}$, for example a fixed value such as 0.5.

In particular, when the ratio Vo/Vi exceeds the threshold value $D_{TH}$ (plus a possible hysteresis), the activation signal M switches and activates the offset generator 51.

For the rest, the voltage converter 70 operates in a manner similar to what has been described with reference to FIGS. 6 and 7.

Figure 12:
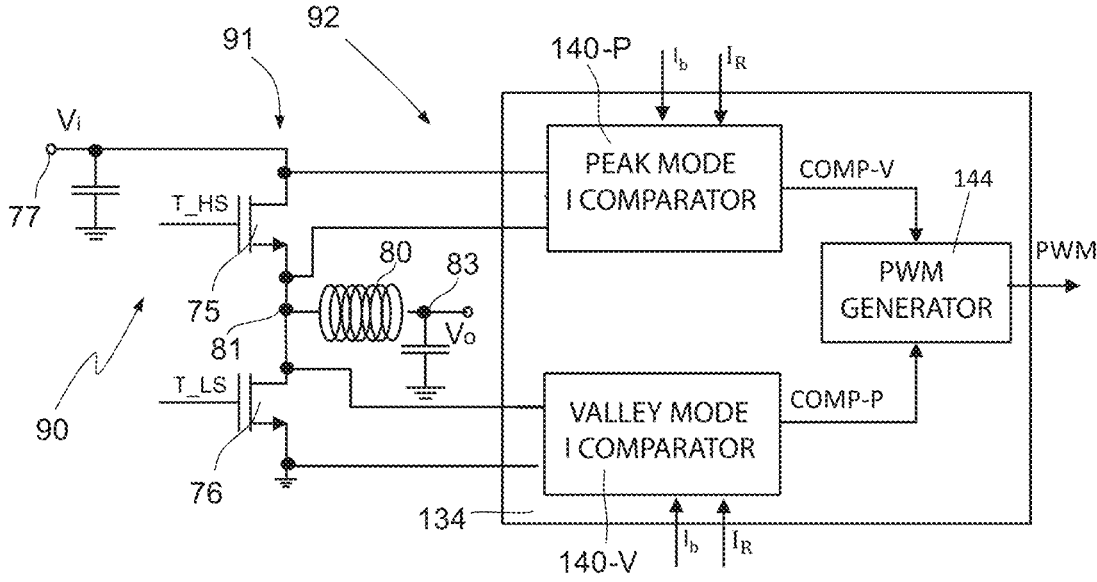
FIG. 12 shows a block diagram of yet another embodiment of the present voltage regulator.

FIG. 12 shows an embodiment of a voltage converter operating only in buck mode, with switches arranged internally to the switching voltage regulator and with measurement of the inductor current both at the peaks and at the valleys, alternately to each other, according to the operating conditions.

In detail, FIG. 12 shows a converter 90 comprising a switching circuit 91 and a control device 92.

The Switching circuit 91 has the same structure as the switching circuit 71 of FIG. 11. Therefore, its components have the same reference numbers.

Here, no sense resistor is arranged between the second terminal of the inductor 80 and the output terminal 83.

Control device 92 has a structure similar to the control device 72 of FIG. 10. Therefore, it is only partially represented as regards the PWM modulator, here indicated by 134, and the common elements have been provided with the same reference numbers.

The PWM modulator 134 comprises two current comparators: a peak current comparator 140-P and a valley current comparator 140-V, both formed, for example, as shown and described for the current comparator 140 of FIG. 10.

The peak current comparator 140-P is coupled to the HSS 75 and senses the voltage drop between the drain and source terminals thereof. In practice, the resistance RDSon of the HHS 75 replaces the sense resistance 19 in FIG. 10.

The valley current comparator 140-V is coupled to the LSS 76 and senses the voltage drop between the drain and source terminals thereof. In practice, the resistance RDSon of the LHS 76 replaces the sense resistance 19 in FIG. 10.

The peak current comparator 140-P and the valley current comparator 140-V also both receive the reference current $I_R$ and the bias current $I_b$ and generate respective comparison signals COMP-P, COMP-V, similar to what has been discussed with reference to FIG. 10.

As in the voltage regulator 70 of FIG. 11 and in a manner not shown, the reference current $I_R$ is generated by a single adder node (similar to the adder node 33 of FIG. 11), adding the control current $I_C$ (generated by the control loop circuit 31, here not shown), the offset current $I_{OFFSET}$ (generated by the offset generator 51, here not shown) and the current ramp Is.

It should be noted that since the offset current IOFFSET is added only in one of the measurement periods of the inductor current IL, for example, in the peak current measurement phase, the reference current $I_R$ supplied to only one of the peak and valley current comparators 140-P, 140-V comprises the offset current $I_{OFFSET}$.

Furthermore, since they operate alternately, they may be activated and deactivated, according to the operating condition, by a specific signal, for example by the activation signal M of FIG. 11.

The comparison signals COMP-P, COMP-V are provided to the PWM generator 144 which may thus generate the control signals T_HS and T_LS, similarly to what has been previously described.

Although FIG. 12 shows that the outputs of the peak and valley current comparators 140-P, 140-V are coupled to different inputs of the PWM generator 144, the comparison signals COMP-P, COMP-V might be provided to a same input of the PWM generator 144, since the respective peak and valley current comparators 140-P, 140-V operate alternately, as explained above.

The control device and method described here thus allow any voltage transient in DC-DC converters during the switching between peak current measurement operation and valley current measurement operation to be reduced by virtue of the injection of an offset current in a transient phase.

This injection also reduces the current limitation error.

Finally, modifications and variations may be made to the device and the method described and illustrated herein without thereby departing from the scope of the present invention, as defined in the attached claims.

What is claimed is:

1. A control device for a switching voltage regulator comprising a switching circuit, the control device comprising:
   a control loop circuit configured to generate a control signal indicative of a difference between an output voltage of the switching circuit and a nominal voltage;
   a drive signal generator circuit coupled to the control loop circuit and configured to:
      receive a measurement signal and a reference signal correlated to the control signal, the measurement signal indicative of a current flowing into the switching circuit,
      compare the measurement signal with the reference signal at peaks of the measurement signal in a first measurement mode,
      compare the measurement signal with the reference signal at valleys of the measurement signal in a second measurement mode, and
      generate pulse-width modulated switching signals for the switching circuit to maintain the output voltage at a regulated value;
   an offset generator circuit configured to generate an offset signal at a transition between the first measurement mode and the second measurement mode; and
   an adder arranged between the control loop circuit and the drive signal generator circuit, the adder configured to add the offset signal and the control signal to generate the reference signal.

2. The control device of claim 1, further comprising a working mode detector circuit configured to:
   receive electrical signals corresponding to a current working condition of the switching circuit; and
   generate an activation signal for the offset generator circuit in response to sensing a predetermined relationship between the electrical signals.

3. The control device of claim 2, wherein the working mode detector circuit is configured to interrupt the activation signal in response to sensing that the predetermined relationship is no longer met.

4. The control device of claim 2, wherein the electrical signals comprise an input voltage of the switching circuit and the output voltage of the switching circuit, the working mode detector circuit configured to generate the activation signal in response to sensing a predetermined relationship between the input voltage and the output voltage.

5. The control device of claim 4, wherein the working mode detector circuit is configured to:
   generate the activation signal in response to sensing that the output voltage is greater than the input voltage plus a hysteresis, or generate the activation signal in response to sensing that the input voltage is greater than the output voltage plus a hysteresis.

6. The control device of claim 4, wherein the working mode detector circuit is configured to:

generate the activation signal in response to sensing that a ratio between the output voltage and the input voltage is greater than a threshold plus a hysteresis, or generate the activation signal in response to sensing that a ratio between the input voltage and the output voltage is less than a threshold plus a hysteresis.

7. The control device of claim 1, wherein the offset generator circuit is a direct current generator circuit.

8. A switching voltage regulator, comprising:

a switching circuit comprising a high-side switch and a low-side switch, the high-side switch and the low-side switch being series coupled to a low-side switch arranged between an input node and a reference potential line;

a control device configured to control an operation of the high-side switch and the low-side switch, the control device comprising:

a control loop circuit configured to generate a control signal indicative of a difference between an output voltage of the switching circuit and a nominal voltage;

a drive signal generator circuit coupled to the control loop circuit and configured to:

receive a measurement signal and a reference signal correlated to the control signal, the measurement signal indicative of a current flowing into the switching circuit, compare the measurement signal with the reference signal at peaks of the measurement signal in a first measurement mode, compare the measurement signal with the reference signal at valleys of the measurement signal in a second measurement mode, and generate pulse-width modulated switching signals for the switching circuit to maintain the output voltage at a regulated value;

an offset generator circuit configured to generate an offset signal at a transition between the first measurement mode and the second measurement mode; and an adder arranged between the control loop circuit and the drive signal generator circuit, the adder configured to add the offset signal and the control signal to generate the reference signal.

9. The switching voltage regulator of claim 8, wherein the drive signal generator circuit comprises:

a first measurement comparator circuit coupled to the high-side switch, the first measurement comparator circuit configured to compare the measurement signal with the reference signal at peaks of the measurement signal in the first measurement mode; and a second measurement comparator circuit coupled to the low-side switch, the second measurement comparator circuit configured to compare the measurement signal with the reference signal at valleys of the measurement signal in the second measurement mode.

10. The switching voltage regulator of claim 8, further comprising a half-bridge circuit, the half-bridge circuit including the high-side switch and the low-side switch, the half-bridge circuit configured to receive the pulse-width modulated switching signals.

11. The switching voltage regulator of claim 8, wherein the control device further comprises a working mode detector circuit, the working mode detector circuit configured to:

receive electrical signals corresponding to a current working condition of the switching circuit; and generate an activation signal for the offset generator circuit in response to sensing a predetermined relationship between the electrical signals.

12. The switching voltage regulator of claim 11, wherein the working mode detector circuit is configured to interrupt the activation signal in response to sensing that the predetermined relationship is no longer met.

13. The switching voltage regulator of claim 11, wherein the electrical signals comprise an input voltage of the switching circuit and the output voltage of the switching circuit, the working mode detector circuit configured to generate the activation signal in response to sensing a predetermined relationship between the input voltage and the output voltage.

14. The switching voltage regulator of claim 13, wherein the working mode detector circuit is configured to:

generate the activation signal in response to sensing that the output voltage is greater than the input voltage plus a hysteresis, or generate the activation signal in response to sensing that the input voltage is greater than the output voltage plus a hysteresis.

15. A method of operating a switching voltage regulator, the method comprising:

receiving an input voltage of a switching circuit of the switching voltage regulator;

receiving an output voltage of the switching circuit;

receiving a measurement signal indicative of a current flowing into the switching circuit;

generating a control signal correlated to a difference between the output voltage and a nominal voltage;

generating pulse-width modulated switching signals based on a comparison between the measurement signal and a reference signal correlated to the control signal, the pulse-width modulated switching signals generated to maintain the output voltage at a regulated value, wherein the comparison between the measurement signal and the reference signal occurs at peaks of the measurement signal in a first measurement mode and at valleys of the measurement signal in a second measurement mode; and adding an offset signal to the control signal in a transition between the first measurement mode and the second measurement mode.

16. The method of claim 15, further comprising:

receiving electrical signals correlated to a current working condition of the switching voltage regulator;

generating an activation signal in response to sensing a predetermined relationship between the electrical signals; and generating the offset signal in response to the generation of the activation signal.

17. The method of claim 16, wherein the activation signal is generated in response to sensing a predetermined relationship between the input voltage and the output voltage.

18. The method of claim 17, wherein sensing a predetermined relationship between the input voltage and the output voltage comprises:

sensing that the output voltage is greater than the input voltage plus a hysteresis; or sensing that the input voltage is greater than the output voltage plus a hysteresis; or sensing that a ratio between the output voltage and the input voltage is greater than a threshold plus a hysteresis.

19. The method of claim 15, wherein the transition is a transition from the second measurement mode to the first measurement mode and the offset signal is interrupted in response to sensing a transition from the first measurement mode to the second measurement mode successive to the transition from the second measurement mode to the first measurement mode.

20. The method of claim 15, wherein the offset signal is a direct current signal.

* * * * *